US012330326B2

(12) United States Patent
Sutter et al.

(10) Patent No.: US 12,330,326 B2
(45) Date of Patent: Jun. 17, 2025

(54) CUTTING MACHINE WITH OVERVIEW CAMERA

(71) Applicant: ZÜND SYSTEMTECHNIK AG, Altstätten (CH)

(72) Inventors: Rolf Sutter, Appenzell (CH); Andreas Grüter, Balgach (CH)

(73) Assignee: ZÜND SYSTEMTECHNIK AG, Altstätten (CH)

(*) Notice: Subject to any disclaimer, the term of this patent is extended or adjusted under 35 U.S.C. 154(b) by 0 days.

(21) Appl. No.: 18/183,150

(22) Filed: Mar. 13, 2023

(65) Prior Publication Data

US 2023/0219248 A1 Jul. 13, 2023

Related U.S. Application Data

(62) Division of application No. 17/700,924, filed on Mar. 22, 2022, now Pat. No. 11,712,815, which is a (Continued)

(51) Int. Cl.
*B26D 5/00* (2006.01)
*B26D 5/34* (2006.01)
*B26F 1/38* (2006.01)

(52) U.S. Cl.
CPC ............ *B26D 5/007* (2013.01); *B26D 5/005* (2013.01); *B26D 5/34* (2013.01); *B26F 1/3813* (2013.01)

(58) Field of Classification Search
CPC ....... B26F 1/3813; B26D 5/005; B26D 5/007; B26D 5/34
See application file for complete search history.

(56) References Cited

U.S. PATENT DOCUMENTS 3,242,573 A * 3/1966 Noel .................... C03B 33/037 33/1 G
3,803,960 A * 4/1974 Pearl .................... B26D 5/005 83/76.4
(Continued)

FOREIGN PATENT DOCUMENTS

AU 2003232277 A1 12/2003
CN 202106140 U 1/2012
(Continued)

OTHER PUBLICATIONS

International Preliminary Report on Patentability—PCT/EP2017/058153—PCT/IB—dated Oct. 8, 2019 (H-P-55232-WO).
(Continued)

*Primary Examiner* — Sean M Michalski
(74) *Attorney, Agent, or Firm* — Muncy, Geissler, Olds & Lowe, P.C.

(57) ABSTRACT

A cutting machine for cutting a flat surface having a graphical design with optical registration features is disclosed. The cutting machine includes a working surface for receiving at least one object, a first camera unit arranged so that the field of vision encompasses the whole working surface, a working group above the working surface, and at least one cutting device for cutting the at least one object. A computing unit with a circuit and program code for controlling the cutting machine includes a storage unit, a circuit and program code for evaluating images of the first camera unit to identify registration features of the at least one object in an image of the first camera unit, and being designed to define a cutting path for the cutting device according to at least one stored instruction and based on positions of the registration features in the image.

11 Claims, 8 Drawing Sheets

Related U.S. Application Data division of application No. 16/603,185, filed as application No. PCT/EP2017/058153 on Apr. 5, 2017, now Pat. No. 11,400,614.

(56) References Cited

U.S. PATENT DOCUMENTS 3,805,650 A * 4/1974 Pearl ........ B26F 1/382 83/56
3,844,461 A * 10/1974 Robison ........ G06K 15/22 396/548
4,071,899 A * 1/1978 Holy ........ B26D 5/34 83/365
4,380,944 A * 4/1983 Gerber ........ B26D 7/018 83/56
4,581,632 A * 4/1986 Davis ........ G01N 21/88 250/559.47
4,583,181 A * 4/1986 Gerber ........ A41H 43/00 250/559.46
4,721,058 A * 1/1988 Hayamizu ........ G01D 9/38 83/371
4,794,453 A * 12/1988 Gnuechte ........ H04N 7/188 348/88
4,853,866 A * 8/1989 Andrada Galan ........ B26D 5/00 700/135
4,882,961 A * 11/1989 Zabinski ........ B26F 3/004 83/936
4,901,359 A * 2/1990 Bruder ........ B26D 5/00 235/494
4,932,320 A * 6/1990 Brunetti ........ B41F 13/12 101/211
4,941,183 A * 7/1990 Bruder ........ C14B 5/00 83/522.11
4,953,485 A * 9/1990 Brower ........ D05B 21/00 112/475.05
4,989,164 A * 1/1991 Desrousseaux ........ B21B 38/00 700/150
5,074,178 A * 12/1991 Shetley ........ B26D 9/00 83/365
5,258,917 A * 11/1993 Bruder ........ B23K 26/032 702/167
5,324,228 A * 6/1994 Vogeley, Jr. ........ A22C 17/0086 452/158
5,333,111 A * 7/1994 Chaiken ........ B26D 5/00 83/76.8
5,394,183 A * 2/1995 Hyslop ........ H04N 7/18 345/157
5,575,099 A 11/1996 Strobel et al.
5,717,456 A * 2/1998 Rudt ........ G01N 21/8903 348/125
5,727,433 A * 3/1998 Pomerleau ........ B26F 1/3813 700/130
5,731,883 A * 3/1998 Morton ........ G03B 35/24 358/401
5,818,721 A * 10/1998 Funahashi ........ B44B 3/009 700/192
5,838,569 A * 11/1998 Gane ........ B26F 1/3813 700/134
6,050,168 A * 4/2000 Kuchta ........ B26D 5/005 83/940
6,099,225 A * 8/2000 Allen ........ B41F 17/02 412/22
6,112,630 A * 9/2000 Miura ........ B26F 1/3806 83/403.1
6,112,658 A * 9/2000 Gunther ........ B26D 5/007 101/171
6,192,777 B1 * 2/2001 Williams ........ B26F 1/3813 83/56
6,205,370 B1 * 3/2001 Blaimschein ........ B26D 5/00 700/134
6,240,847 B1 * 6/2001 Zoll ........ B41F 1/54 101/486
6,298,275 B1 * 10/2001 Herman, Jr. ........ B26F 1/38 700/59
6,434,444 B2 * 8/2002 Herman, Jr. ........ B26D 5/005 700/134
6,520,080 B1 * 2/2003 Fried ........ B65H 16/106 101/484
6,563,130 B2 * 5/2003 Dworkowski ........ G01S 17/46 702/158
6,606,947 B2 * 8/2003 Frossard ........ B41F 33/0036 101/171
6,619,167 B2 * 9/2003 Mikkelsen ........ B26D 5/005 83/365
6,619,168 B2 * 9/2003 Alsten ........ B26D 5/005 83/365
6,672,187 B2 * 1/2004 Alsten ........ B26D 5/005 83/365
6,772,661 B1 8/2004 Mikkelsen et al.
6,856,843 B1 * 2/2005 Herman, Jr. ........ B26D 5/005 700/95
7,031,527 B2 * 4/2006 Ishikawa ........ G06V 10/46 356/238.1
7,140,283 B2 * 11/2006 Alsten ........ B26D 5/007 83/365
7,617,751 B2 * 11/2009 James ........ B26D 1/18 83/289
7,693,432 B2 * 4/2010 Belinkov ........ G03G 15/5062 399/15
8,073,239 B1 * 12/2011 Bahrami ........ G06T 7/001 382/141
8,175,739 B2 * 5/2012 Floeder ........ G01N 21/89 700/122
8,238,646 B2 * 8/2012 Floeder ........ D06H 1/02 700/125
8,922,641 B2 * 12/2014 Bertin ........ G06T 7/001 348/86
8,924,002 B2 * 12/2014 Andersen ........ B26F 1/3813 83/13
9,199,386 B2 * 12/2015 Muto ........ B26D 5/005
9,302,404 B2 * 4/2016 Matsushima ........ B26D 7/26
9,310,482 B2 * 4/2016 Rosenberg ........ G01B 21/042
9,466,229 B2 * 10/2016 Halbrook, Jr. ........ G09F 3/0288
9,574,998 B2 * 2/2017 Noguchi ........ G01N 21/55
9,635,908 B2 * 5/2017 Chang ........ A43D 27/00
9,716,805 B2 * 7/2017 Ooishi ........ H04N 1/00968
9,815,143 B2 * 11/2017 Fazeny ........ B26D 5/007
10,043,256 B2 * 8/2018 Toskala ........ G01B 11/0691
10,061,292 B2 * 8/2018 Püschner ........ B65C 9/44
10,161,879 B1 * 12/2018 Hegstrom ........ G01N 21/896
10,195,758 B2 * 2/2019 Abe ........ B26F 1/38
10,226,836 B2 * 3/2019 Kurosawa ........ B23K 26/38
10,624,722 B1 * 4/2020 Culp ........ B23K 26/38
2002/0144578 A1 * 10/2002 Mikkelsen ........ B26D 5/00 83/13
2002/0144579 A1 10/2002 Alsten et al.
2002/0190230 A1 * 12/2002 Dworkowski ........ G01S 17/46 250/559.38
2003/0047045 A1 3/2003 Alsten et al.
2003/0083850 A1 * 5/2003 Schmidt ........ G06T 7/001 702/189
2004/0040943 A1 * 3/2004 Lundberg ........ G06K 1/126 219/121.68
2005/0051523 A1 * 3/2005 Legge ........ B23K 26/043 219/121.82
2005/0154490 A1 * 7/2005 Blaine ........ B26D 5/005 700/103
2006/0162512 A1 * 7/2006 Nasu ........ B26F 1/3826 83/13
2007/0037496 A1 2/2007 Habermann et al.
2008/0028904 A1 * 2/2008 Arikita ........ B26D 7/018 83/167
2009/0086199 A1 * 4/2009 Troy ........ G01S 7/497 356/251
2010/0045423 A1 * 2/2010 Glickman ........ H04N 7/181 340/5.1
2010/0175521 A1 * 7/2010 Dubesset ........ B26D 5/34 83/13

(56) References Cited

U.S. PATENT DOCUMENTS

| | | | | |
|---|---|---|---|---|
| 2010/0254721 | A1* | 10/2010 | Fukita | B65H 29/34 399/92 |
| 2010/0300256 | A1 | 12/2010 | Loewe et al. | |
| 2011/0108531 | A1* | 5/2011 | Stokes | B23K 26/40 219/121.68 |
| 2012/0197427 | A1 | 8/2012 | Gallucci | |
| 2012/0266728 | A1* | 10/2012 | Andersen | B26D 5/005 83/13 |
| 2013/0177215 | A1* | 7/2013 | Campbell | B26D 5/007 382/111 |
| 2013/0180374 | A1* | 7/2013 | Abe | B26D 5/005 83/76.8 |
| 2014/0182463 | A1* | 7/2014 | Muto | B26D 7/27 101/3.1 |
| 2014/0188268 | A1* | 7/2014 | Tashiro | B26F 1/3806 700/125 |
| 2014/0260854 | A1* | 9/2014 | Tokura | B26F 1/3813 83/76.1 |
| 2014/0283662 | A1* | 9/2014 | Tokura | B41J 25/308 83/76.1 |
| 2015/0008640 | A1* | 1/2015 | Kambayashi | B65H 5/062 271/274 |
| 2015/0094836 | A1* | 4/2015 | Rivers | B26D 5/007 700/160 |
| 2015/0360323 | A1* | 12/2015 | Fazeny | B23K 26/38 219/121.72 |
| 2016/0031110 | A1 | 2/2016 | Middleton et al. | |
| 2016/0046033 | A1* | 2/2016 | Zuech | B65H 23/046 700/127 |
| 2016/0263763 | A1* | 9/2016 | Mikkelsen | B26F 1/38 |
| 2019/0152736 | A1* | 5/2019 | Gordon | B26D 5/007 |
| 2019/0243343 | A1* | 8/2019 | Kiefer | B23Q 7/12 |
| 2019/0376909 | A1* | 12/2019 | Hegstrom | G05B 19/41875 |
| 2020/0048024 | A1* | 2/2020 | Nasu | B26D 7/24 |
| 2020/0094579 | A1* | 3/2020 | Dziesietnik | G06F 3/125 |
| 2020/0398451 | A1* | 12/2020 | Zimmermann | B26D 3/085 |
| 2021/0008747 | A1* | 1/2021 | Sugiyama | B26D 7/28 |
| 2021/0008904 | A1* | 1/2021 | Sakajo | B41J 11/706 |
| 2023/0267625 | A1* | 8/2023 | Tentori | G06V 10/25 382/294 |

FOREIGN PATENT DOCUMENTS

| | | | |
|---|---|---|---|
| CN | 101262990 | A | 3/2013 |
| CN | 101801599 | A | 4/2014 |
| CN | 102574288 | A | 9/2014 |
| DE | 4100534 | C1 | 1/1992 |
| DE | 102004020472 | A1 | 11/2005 |
| EP | 0211789 | A1 | 2/1987 |
| EP | 0494433 | A2 | 7/1992 |
| EP | 1724075 | A2 | 11/2006 |
| EP | 1385674 | B1 | 6/2008 |
| EP | 2488333 | B1 | 3/2014 |
| EP | 2894014 | B1 | 3/2016 |
| WO | 9117028 | A1 | 11/1991 |
| WO | 03107106 | A1 | 12/2003 |
| WO | 2008010289 | | 1/2008 |
| WO | 2016183390 | A1 | 11/2016 |

OTHER PUBLICATIONS

International Search Report and Written Opinion dated Aug. 9, 2017 in International Application No. PCT/EP2017/058153.

Kombo SD Plotter DA Taglio Automatico Con Sistema Integrato Cad-Cam; 2013 (explanation provided in "PCT—Third Party Observation" dated Jul. 18, 2019).

Elitron Kombo SD—Official Video [eng], "Multi-Tool Cutting Head for Milling—Creasing—Cutting Materials up to 120MM Thick", Youtube, https://www.youtube.com/watch?v=7vBHxtm406w, Jun. 2, 2015 (Citation#2 in "PCT-Third Party Observation" dated Jul. 18, 2019).

AGFA Procedure Inkjet Application Document; Sep. 23, 2015 (explanation provided in "PCT—Third Party Observation" dated Jul. 18, 2019).

AGFA Acorta https://www.agfagraphics.com/global/en/product-finder/acorta.html; Jul. 19, 2019 (explanation provided in "PCT—Third Party Observation" dated Jul. 18, 2019).

AGFA Graphics Launches Acorta Automatic Cutting Plotter with Auto Recognition https://www.agfagraphics.com/global/en/articles/news/20150109_acorta.html; Jan. 29, 2015 (explanation provided in "PCT—Third Party Observation" dated Jul. 18, 2019).

AGFA European Debut for Agfa Graphics' Acorta Automatic Cutting Plotter at FESPA 2015 https://www.agfagraphics.com/global/en/articles/news/20150512-acorta-fespa.html; May 13, 2015 (explanation provided in "PCT—Third Party Observation" dated Jul. 18, 2019).

Wikipedia "High-dynamic-range imaging"; https://en.wikipedia.org/wiki/High-dynamic-range_imaging; Jul. 18, 2019 (explanation provided in "PCT—Third Party Observation" dated Jul. 18, 2019).

PCT—Third Party Observation for International application No. PCT/E P2017 /058153, Date of submission Jul. 18, 2019, Language of observation English. Document includes explanation for NPL citations noted above.

* cited by examiner

CUTTING MACHINE WITH OVERVIEW CAMERA

CROSS-REFERENCE TO RELATED APPLICATIONS

This application is a Divisional application of U.S. application Ser. No. 17/700,924 filed on Mar. 22, 2022, which is a Divisional application of U.S. application Ser. No. 16/603,185 filed on Oct. 4, 2019, which is a 371 National Phase of PCT Application No. PCT/EP2017/058153, filed on Apr. 5, 2017, now U.S. Pat. No. 11,400,614 issued Aug. 2, 2022; the disclosures of each of which are herein incorporated by reference in their entirety.

BACKGROUND

The invention relates to a cutting machine with a camera, in particular a cutting machine which is designed for the cutting of objects which have a surface with a graphical design and optical register features. These objects may be in particular printed sheets made of paper, cardboard or similar materials, plastic films, or cloths or the like.

Generic machines are described for example in documents EP 1 385 674 B1 and EP 2 488 333 B1. Such a cutting machine has a working surface, which is designed to receive at least one object, and a working group arranged movably above the working surface and having a blade or another cutting device for cutting objects situated on the working surface. Furthermore, a camera unit is arranged relative to the working surface, in particular above the working surface, in such a way that the field of vision of the camera unit comprises the entire working surface ("overview camera"). Based on positions of the optical register features in an image of the overview camera, a cutting path may then be defined depending on a selected cutting instruction.

The term "cutting" shall not necessarily be understood to mean a complete severance, and therefore a "cutting instruction" may also include a perforating or folding of the object, or a similar process step which can be carried out using a generic machine.

SUMMARY

An object of the invention is to provide an improved cutting machine.

In particular, an object of the invention is to provide a cutting machine by means of which cutting instructions can be carried out more quickly.

A further object is to provide a cutting machine by means of which cutting instructions can be carried out with a lower staffing requirement or with a higher degree of automation.

A further object is to provide a cutting machine having an overview camera by means of which cutting parts are definable more quickly and/or more precisely.

A further object is to provide a cutting machine of this kind with which less waste is produced.

At least one of these objects is achieved by the realisation of the characterising features of the independent claims. Advantageous embodiments of the invention can be found in the dependent claims.

The invention relates to a cutting machine which is designed for the cutting of objects which have a flat surface, wherein the surface has a graphical design with optical register features. The cutting machine according to the invention has a working surface, which is designed to receive at least one object, a first camera unit, which is arranged relative to the working surface in such a way that the field of vision of the camera comprises the entire working surface, and a working group, which is arranged movably above the working surface and has at least one cutting device for cutting the at least one object.

In addition, a computing unit with a circuit and program code for controlling the cutting machine is provided, which computing unit comprises a memory unit for storing instructions for the cutting of certain objects. The computing unit has a circuit and program code for analysing images of the first camera unit and is designed to recognise register features of the at least one object in an image of the first camera unit. It is additionally designed to define a cutting path for the cutting device in accordance with at least one stored instruction and on the basis of positions of the register features in the image.

The register features can be present in particular in the form of register marks which are designed specifically for use with the cutting machine in order to make a position and orientation of the object relative to the working surface detectable. The computing unit is then designed to recognise the register marks on the surface of the at least one object in an image of the first camera unit and to define the cutting path also on the basis of the positions of the register marks.

In one embodiment the computing unit is designed to select an instruction on the basis of recognised register features and/or positions thereof.

The invention additionally relates to a computer program product with program code, which is stored on a machine-readable carrier, for controlling the cutting machine according to the invention, wherein the program is run on the computing unit of the cutting machine and comprises at least the following steps:

- recording an image of the working surface,
- recognising register features of at least one object in the image,
- associating the at least one object with at least one stored instruction,
- defining at least one cutting path on the basis of the instruction and on the basis of positions of the register features in the image, and
- controlling a cutting device for cutting the at least one object along the at least one cutting path.

A first aspect of the invention relates to a cutting machine in which reference marks are provided on the working surface and in the field of vision of the camera, with the aid of which reference marks a more accurate determination of the position of the objects is made possible.

A second aspect of the invention relates to a cutting machine in which a known material thickness of the objects is taken into consideration during the position determination.

A third aspect of the invention relates to a cutting machine in which the camera is designed to record a number of images of an identical scene and to superimpose the images.

A fourth aspect of the invention relates to a cutting machine in which an additional, movably arranged second camera of which the field of vision comprises a small detail of the working surface is used jointly with the first camera in order to determine the position of the objects.

A fifth aspect of the invention relates to a cutting machine in which an additional, movably arranged second camera of which the field of vision comprises a small detail of the working surface is usable in order to calibrate the first camera.

A sixth aspect of the invention relates to a cutting machine in which further information, by means of which a partial region of the working surface is defined as a region of interest, is used in order to determine the position of the register features on the working surface more quickly and/or more accurately.

In a cutting machine according to the invention according to the first aspect, reference features are additionally arranged in a known positioning and distribution relative to the working surface and in the field of vision of the first camera, wherein the computing unit is designed to recognise the reference features in the image of the first camera unit and to define the cutting path also on the basis of relative positions of the register features and the reference features in the image of the first camera unit.

In one embodiment the positions of the reference features and of the working group relative to one another are known.

In a further embodiment the computing unit is designed to check the orientation of the first camera unit relative to the working surface on the basis of positions of multiple reference features in the image of the first camera unit.

In a cutting machine according to the invention according to the second aspect, information regarding the material thickness of the object to be cut is provided to the computing unit, and the computing unit is designed to define the cutting path also on the basis of the information regarding the material thickness.

In one embodiment the computing unit is designed to determine positions of the register features on the basis of the image of the first camera unit and on the basis of the information regarding the material thickness.

In a further embodiment the material thickness can be determined by the cutting machine itself, in particular in a camera-based manner.

In a further embodiment the material thickness is provided in the memory unit together with the corresponding instruction, in particular as part of the instruction.

In a cutting machine according to the invention according to the third aspect, the computing unit is designed to jointly analyse at least two images of the working surface recorded at different times by means of the first camera unit and to determine positions of the register features by analysis of the at least two images.

In one embodiment the first camera unit is designed to record at least two images of the working surface at different times and in each case with a different exposure time, wherein one high-contrast image is created on the basis of the at least two images.

In a further embodiment the computing unit is designed to create high-contrast images from a bracketing of a plurality of images of the first camera unit.

In a further embodiment the first camera unit is designed to record high-contrast images.

In a further embodiment the first camera unit is designed to provide high-contrast images of the working surface, wherein different exposure times are used for recording and the computing unit has a circuit and program code for analysing the high-contrast images of the first camera unit and is designed to recognise register features of the at least one object in a high-contrast image.

In accordance with the fourth and fifth aspect of the cutting machine according to the invention, said cutting machine additionally has an optical sensor unit, which is oriented in the direction of the working surface and is arranged displaceable relative to the working surface in such a way that a plurality of positions in which a detection region of the optical sensor unit comprises part of the working surface can be captured by the optical sensor unit. The computing unit additionally has a circuit and program code for analysing data of the optical sensor unit.

In a cutting machine according to the invention according to the fourth aspect, the control unit is designed

- to detect positions of at least a plurality of the register features relative to one another by means of the image of the first camera unit as relative positions,
- to determine positions of a first subset of the plurality of register features relative to the working surface by means of the data of the optical sensor unit as absolute positions, and
- to determine positions of a second subset of the plurality of register features relative to the working surface on the basis of the detected relative positions and the determined absolute positions.

In one embodiment the optical sensor unit is designed as a second camera unit.

In a further embodiment the optical sensor unit is designed as part of the working group.

In a further embodiment the detection regions of the optical sensor unit, considered together, comprise the entire working surface.

In a further embodiment the first camera unit is designed as a line scan camera, wherein the field of vision extends over the entire width of the working surface.

In a further embodiment the control unit is designed to determine a position of an object on the working surface and/or to define a cutting path on the basis of positions of register features relative to the working surface.

In a cutting machine according to the invention according to the fifth aspect, the working group and the optical sensor unit are displaceable relative to the working surface by the same displacement mechanism. The cutting machine has a calibration function for the first camera unit, wherein the cutting machine, within the scope of the calibration function, is designed

- to determine positions of a plurality of points by means of the optical sensor unit,
- to record the same points by means of the first camera unit, and
- to calibrate the first camera unit with the positions determined by the optical sensor unit as target positions.

In one embodiment the working surface is designed as a calibration working surface, and the plurality of points are optical markings on the calibration working surface.

In a further embodiment the points of the plurality of points are designed as grid points intended specifically for use with the calibration function.

In a further embodiment the cutting machine is designed, within the scope of the calibration function, to calibrate the displacement mechanism and the first camera unit relative to one another.

In a further embodiment the calibration function progresses fully automatically following its start, in particular wherein the start is initiatable by a user.

In a further embodiment the optical sensor unit is designed as a second camera unit.

In a further embodiment the optical sensor unit is designed as part of the working group.

In a further embodiment the detection regions of the optical sensor unit, considered together, comprise the entire working surface.

In a cutting machine according to the invention according to the sixth aspect, an instruction for cutting a specific object comprises information regarding an anticipated position of the object on the working surface, wherein the control unit is designed, on the basis of the anticipated position of at least one object, to derive anticipated positions of register features and in an image of the first camera unit to define areas around the anticipated positions as region of interest, beyond which no register features are searched for.

In one embodiment the first camera unit is designed to show only one partial area or a plurality of partial areas comprising the areas defined as region of interest.

In a further embodiment the first camera unit has a zoom function and is designed to zoom in on a partial area.

In a further embodiment the control unit is designed to analyse, in a partial area, only the at least one area defined as region of interest.

In the cutting machines according to any of the aforementioned aspects, the register features may be present in the form of "register marks" which are designed specifically for use with the cutting machine and in such a way that a position and orientation of the object relative to the working surface is detectable. The computing unit is then designed to recognise these register marks on the surface of the at least one object in an image of the first camera unit and to define the cutting path also on the basis of the positions of the register marks. The register marks may comprise in particular geometric figures.

In one embodiment the register features may also comprise edges of the object.

In a further embodiment the computing unit is designed to select an instruction on the basis of recognised register features.

The invention also relates to a computer program product with program code, which is stored on a machine-readable carrier, for controlling at least one of the above-described cutting machines, wherein the program is executed on the computing unit of the cutting machine and comprises at least the following steps:

- recording an image of the working surface;
- recognising register features of at least one object in the image;
- associating the at least one object with at least one stored instruction;
- defining at least one cutting path on the basis of the instruction and positions of the register features in the image; and
- controlling a cutting device for cutting the at least one object along the at least one cutting path.

BRIEF DESCRIPTION OF THE DRAWINGS

The cutting machine according to the invention will be described in greater detail hereinafter purely by way of example on the basis of specific exemplary embodiments shown schematically in the drawings, wherein further advantages of the invention will also be discussed. The drawings specifically show.

DETAILED DESCRIPTION

Figure 1:
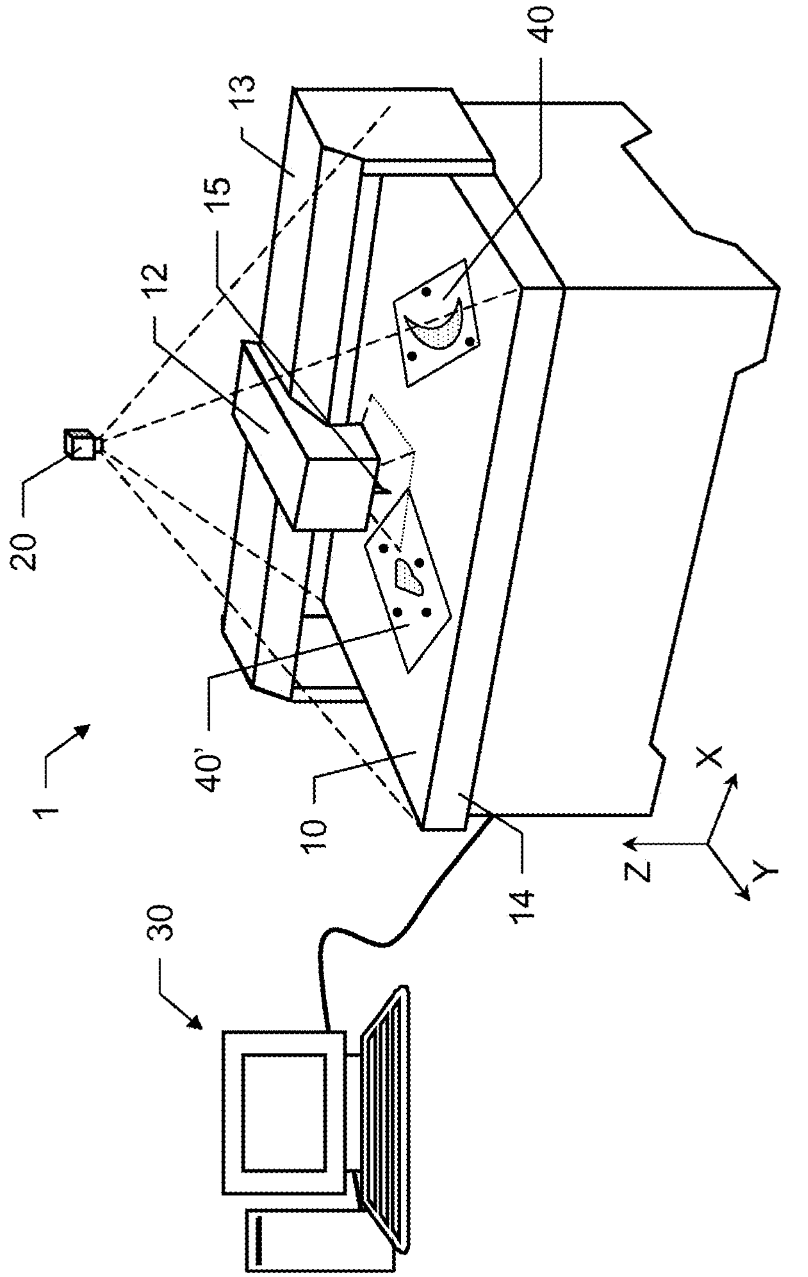
FIG. 1 a generic cutting machine with an overview camera.

FIG. 1 shows a generic cutting machine 1. As a flat-bed cutting machine, it has a table with a flat working surface 10, on which there are placed, by way of example, two objects 40, 40' to be cut.

Above the working surface 10 there is arranged a working group 12 with a cutting tool 15, in particular a blade. The working group 12 is displaceable two-dimensionally relative to the working surface 10 in a motorised manner so as to be able to approach any point of the working surface 10. To this end, the working group 12 is mounted movably in the X direction on a beam 13, which is in turn mounted movably in the Y direction on the table.

A camera unit (overview camera 20) is arranged above the working surface 10 so that images of the entire working surface 10 can be recorded.

In particular, the cutting machine 1 may also have a cutting tool 15 driven in oscillation and/or may be designed for cutting multi-walled composite plates, as described for example in EP 2 894 014 B1.

The cutting machine 1 additionally has a computing unit 30. As shown here, the computing unit may be embodied as an external computer, which has a data connection to the machine 1, or may be integrated in the form of an internal control unit into the machine 1 itself. The overview camera 20 is designed to provide data of recorded images to the computing unit 30 for analysis.

The computing unit 30 comprises a processor with computing capacity and algorithms for controlling the cutting machine 1 in accordance with a provided cutting instruction. The computing unit 30 additionally has a data memory for storing the cutting instructions and possibly further data.

As a starting position, one or more of the objects 40, 40' to be cut are placed on the working surface 10. It is either known precisely with which instruction or which instructions the objects 40, 40' placed on the working surface 10 are associated, or it is at least known from which collection of instructions this instruction or these instructions originate.

An image of the entire working region is recorded by means of the overview camera 20, and the position of the cutting contours is determined on the basis of this image. This is achieved by detection of register features in the graphical surface of the objects and also by detection of the position of said register features. The register features are stored as part of the instruction data in the relevant instruction and may be present either in the form of general features of the graphical design, or, advantageously, as register marks provided specifically for registration. This is known from the prior art.

If the corresponding instruction is not yet known, the corresponding instruction may be determined initially with the aid of these markings and position thereof. If there are a plurality of instructions, all corresponding instructions are determined. The position of the cutting contours on the working surface is then determined via the object positions and the relative position of the cutting contours in the instruction data. This is shown by way of example in FIGS. 2*a-c*.

Figure 2A:
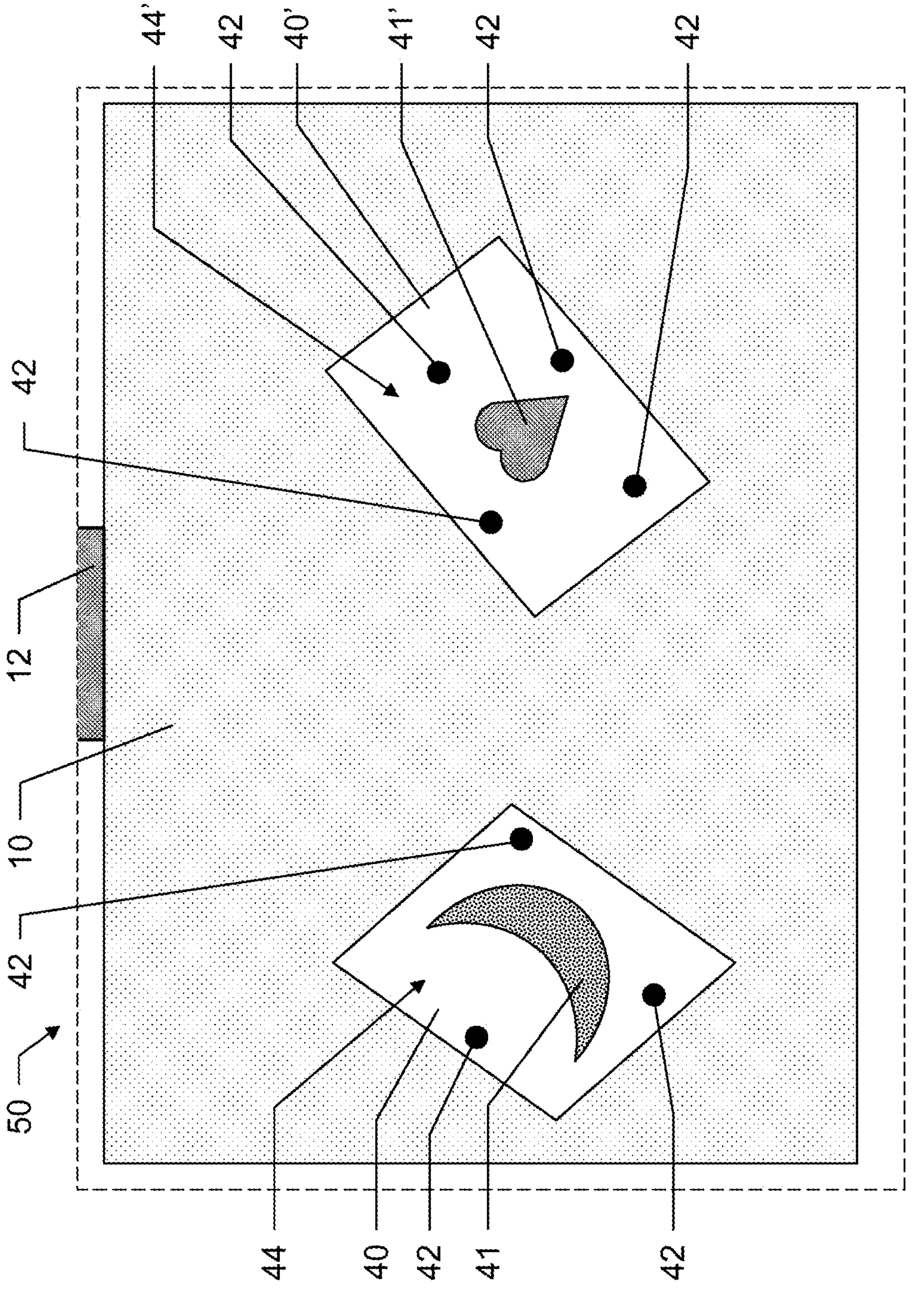
FIG. 2*a-c* an image of the overview camera, on the basis of cutting contours derived from the image and a cutting path of the cutting device defined on the basis of the image.

FIG. 2*a* shows an image 50 recorded by the overview camera 20 of the cutting machine 1 from FIG. 1. The image region comprises the entire working region of the cutting machine, inclusive of the working surface 10, on which two objects 40, 40' to be cut are situated. The working group 12 can be seen at the upper edge of the image and is preferably moved to the edge of the working region in order to record the image. The objects to be cut in this example are sheets 40, 40' (for example made of paper, cardboard or plastic) and each have a graphical design 44, 44' with patterns and/or inscriptions on their side facing the camera. In the shown example the graphical design in one case is a pattern in the shape of a crescent moon 41 and in the other case is a heart-shaped pattern 41'. In addition, a number of register marks 42 on each of the sheets 40, 40' are shown. Register marks 42 may be in particular geometric figures, for example circular points of a certain diameter, as shown here.

Figure 2B:
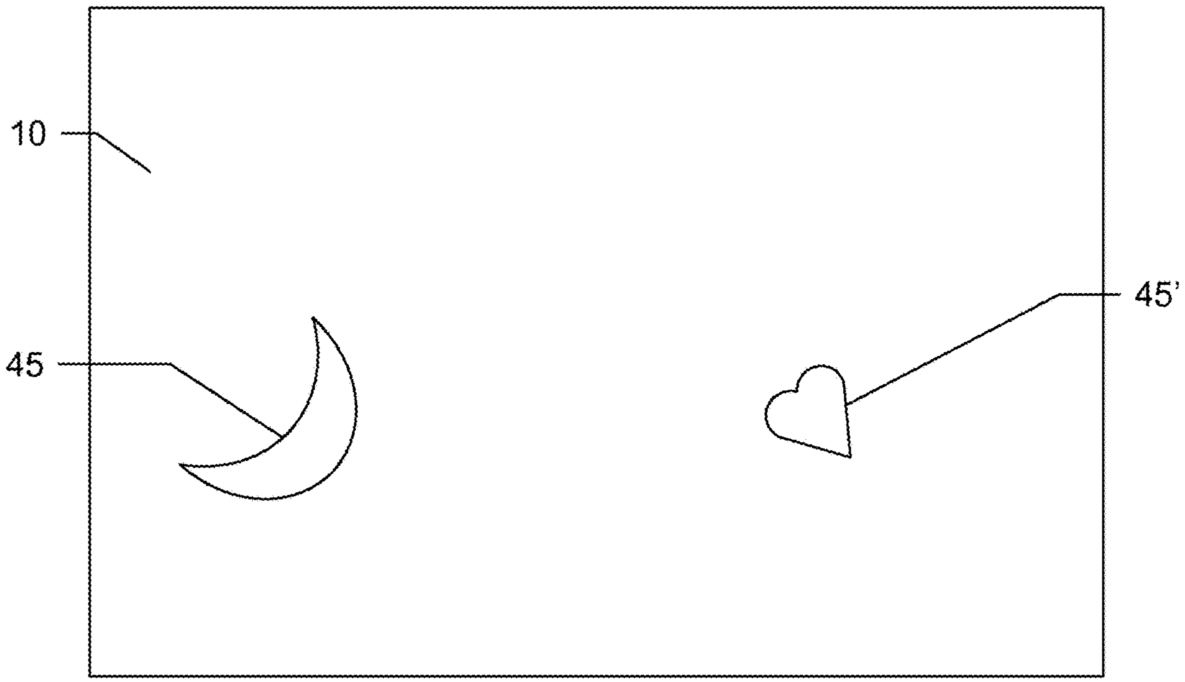

FIG. 2*b* shows the cutting contours 45, 45' of the sheets 40, 40' to be cut. The shapes of the cutting contours 45, 45' and the relative positions thereof on each of the sheets 40, 40' are stored in instructions. Together with the image 50 from FIG. 2*a*, a position of the cutting contours 45, 45' on the working surface may be determined.

On the basis of the image 50 from FIG. 2*a*, the corresponding instruction optionally also can be associated with the relevant sheet 40, 40' by the control unit.

Figure 2C:
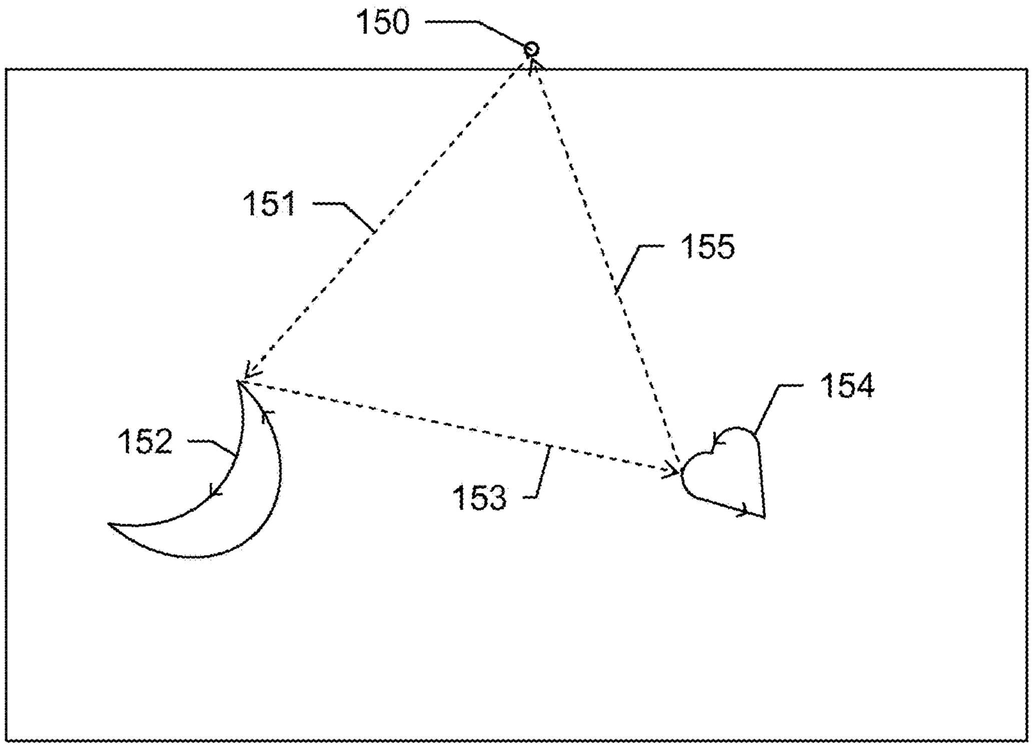

FIG. 2*c* illustrates, by way of example, a movement path for the cutting tool of the machine generated on the basis of the determined positions of the cutting contours 45, 45'. Here, the working group is moved relative to the working surface in such a way that the cutting tool is moved firstly from its original position 152 a first cutting path (dashed line 151). The cutting tool is then brought, for example lowered, into a cutting position and cuts the object along the cutting path (solid line 152.

Figure 3:
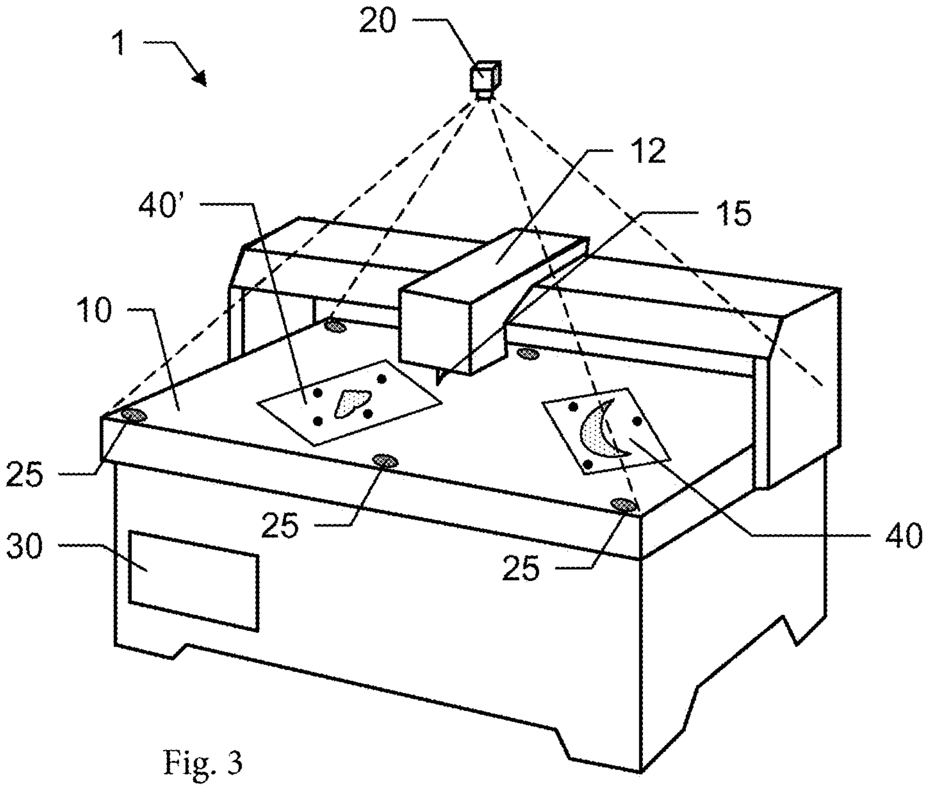
FIG. 3 an exemplary embodiment of a cutting machine according to the first aspect of the invention.

FIG. 3 shows an exemplary embodiment of a cutting machine 1, which has a plurality of reference marks 25 corresponding to the first aspect of the present invention, which reference marks are arranged in the field of vision of the overview camera 20 and fixedly in relation to the working surface 10. In the shown example six reference marks 25 are distributed around the edge of the working surface. The reference marks 25 may be identified in the images of the overview camera 20, and their position in the image may be compared with their known defined positions relative to the working surface 10. The computing unit 30 (shown here integrated in the machine) is thus able to determine positions of objects 40, 40' on the working surface 10 or positions of referencing features on the objects 40, 40', in each case with greater accuracy, on the basis of the positions of the reference marks 25.

It is also possible to verify a correct orientation of the overview camera 20 relative to the working surface 10, and to correct the orientation as necessary, on the basis of the positions of the reference marks 25 in the image of the overview camera 20.

Figure 4:
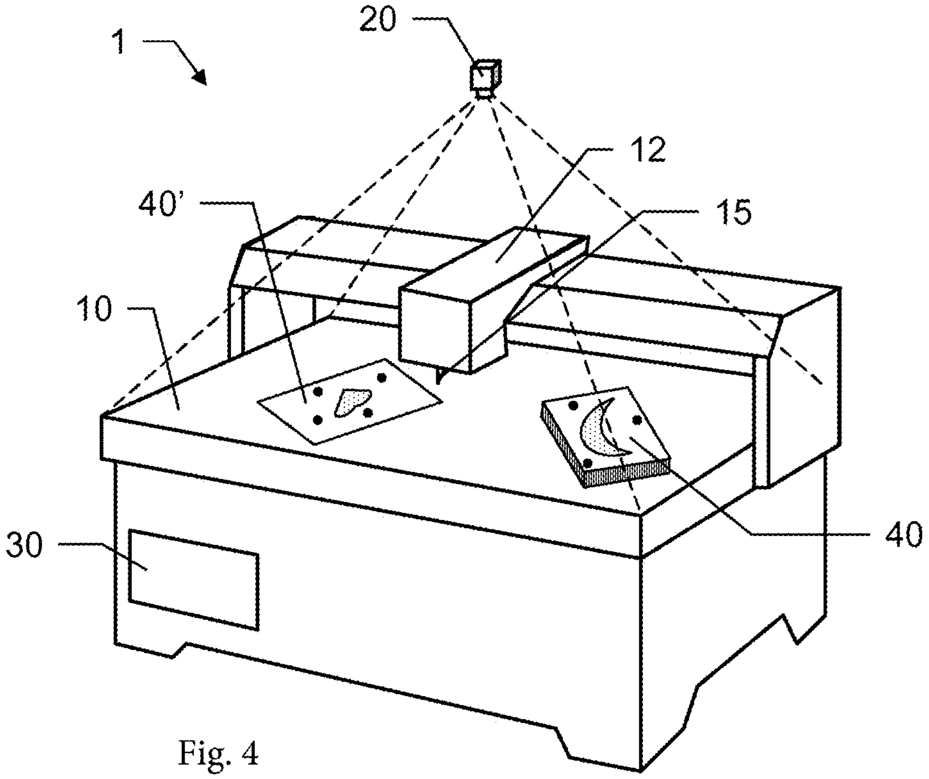
FIG. 4 an exemplary embodiment of a cutting machine according to the second aspect of the invention.

FIG. 4 shows a cutting machine 1, on the working surface 10 of which there are placed two objects 40, 40' of different material thickness. The first object 40 has a greater material thickness and is made for example of a multi-layer cardboard or a composite plate. As a result of the position of the overview camera 20, there are distortions in the images recorded by said overview camera, and these distortions increase with greater proximity to the edges of the image. However, in the case of a negligible material thickness (for example in the case of paper), as is the case here with the second object 40', due to the planar surface of the working surface 10 there are no problems encountered when recognising objects 40, 40' or their position on the working surface 10.

Figure 5:
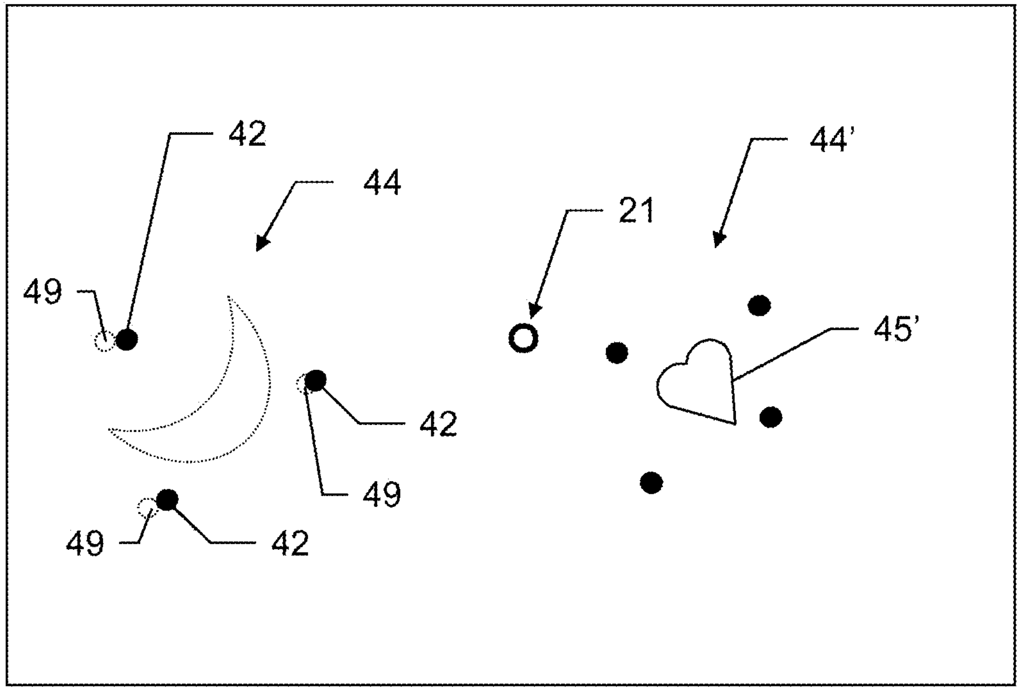
FIG. 5 distortions in an image of the overview camera.

The distortions become relevant, however, with increasing material thickness and increasing eccentricity in the positioning of the object relative to the camera position. This is illustrated in FIG. 5. This shows the object features 44, 44' of the two objects from FIG. 4 recognised in the image of the camera. Whereas the features 44' of the thin object 40' made of paper are presumed to be in their correct position, the presumed positions of the features 44 of the thick object 40, which on account of the greater material thickness are situated in a plane distanced further from the working surface 10 than the features 44' of the thin object 40', deviate more greatly from their actual positions with increasing distance from the camera position 21. The reference marks 42 in the image of the camera are thus each shown further away from the image centre (dashed circles 49) than they are actually situated.

On the one hand, this may mean that the object 40 either is not recognised at all on the basis of the image of the overview camera 20, or is even mistaken for another object and is thus cut incorrectly. On the other hand, it is possible that the object 40 is correctly recognised, but, since the positions of the reference features have been deduced incorrectly, an imprecise to completely incorrect cutting path is calculated. In this case the object 40 is also cut incorrectly.

This problem is solved in accordance with the second aspect of the present invention in that information regarding the material thickness of the object 40 to be cut is provided to the control unit 30. The material thickness may be determined beforehand by a camera, specified by a user, or also provided as part of the instruction, for example.

A deviating distortion in the image of the overview camera 20 may be excluded by means of the information regarding the material thickness, whereby an exact recognition and determination of the position of the object 40 and its register features is made possible.

Alternatively, the overview camera 20 may be designed to be automatically height-adjustable and may be displaced in the Z direction depending on the material thickness, whereby the distance to the object surface and therefore the focus remain constant independently of the particular material thickness.

Figure 6:
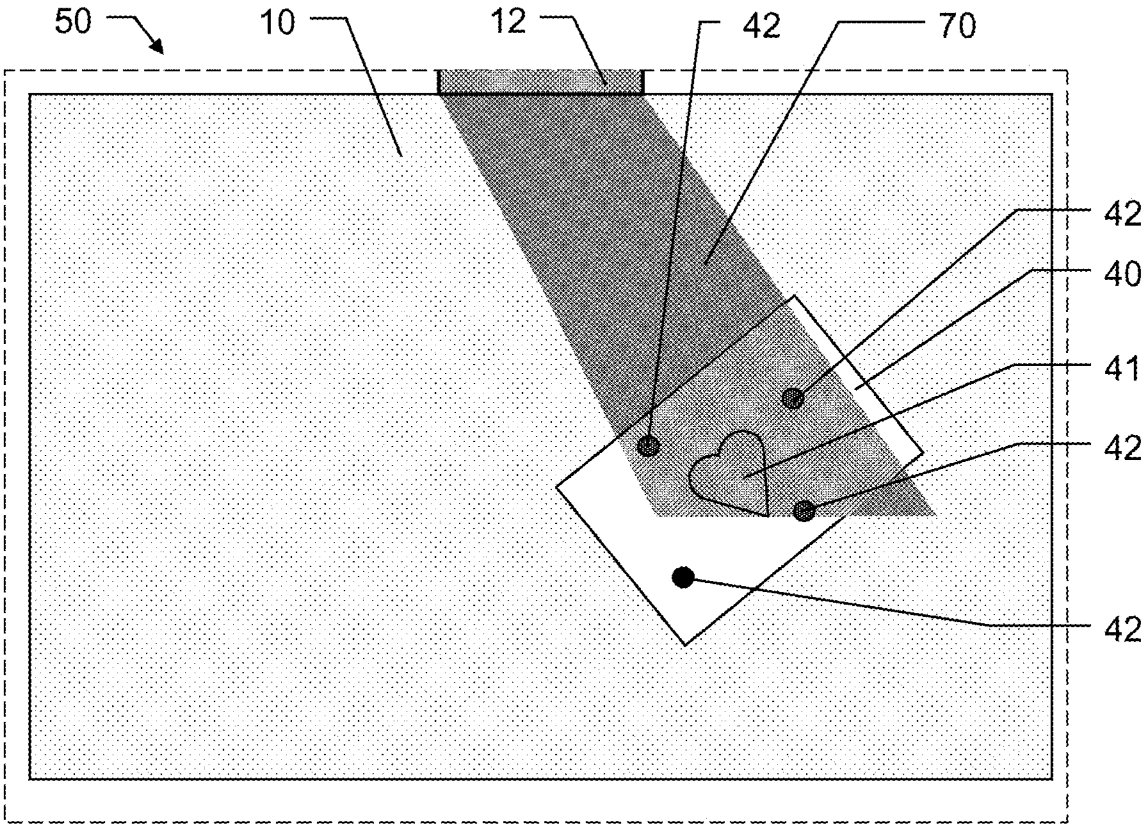
FIG. 6 shadowing in an image of the overview camera.

FIG. 6 shows an image 50 of the working surface 10 recorded by the overview camera 20. The working surface 10 is partially in a shadow 70. This may be the result of direct solar radiation, for example, such that the working group 12 casts a shadow 70 over the working surface 10, as in this example. The object 40 to be cut is situated partially in the shadow 70 and partially in the brightly lit area of the working surface 10.

A disadvantage may therefore be that not all contours of the register features are detected with sufficient precision in the image 50 of the overview camera. In accordance with the third aspect of the invention the camera therefore detects an HDR (=high dynamic range) image of the working surface 10, so as to ensure a sufficiently high contrast both in dark and light areas for determination of the position of the register marks 42 in the image 50.

Various methods are known for recording HDR images. For example, two images of different exposure time recorded directly one after the other may be superimposed. Alternatively, just one image is recorded, wherein the overview camera is designed to select the exposure time for each pixel or for certain pixel areas depending on the brightness of the particular imaging region.

A recording of a plurality of images of the same scene may be used advantageously—also with uniform exposure—in order to reduce artefacts and image noise and thus in order to more accurately determine contours, so as to enable a more accurate and quicker determination of the position of the register marks 42 in the image 50. Pixels at the edge regions of the register marks 42 for example may be assigned a brightness value averaged from values of the plurality of images.

Figure 7:
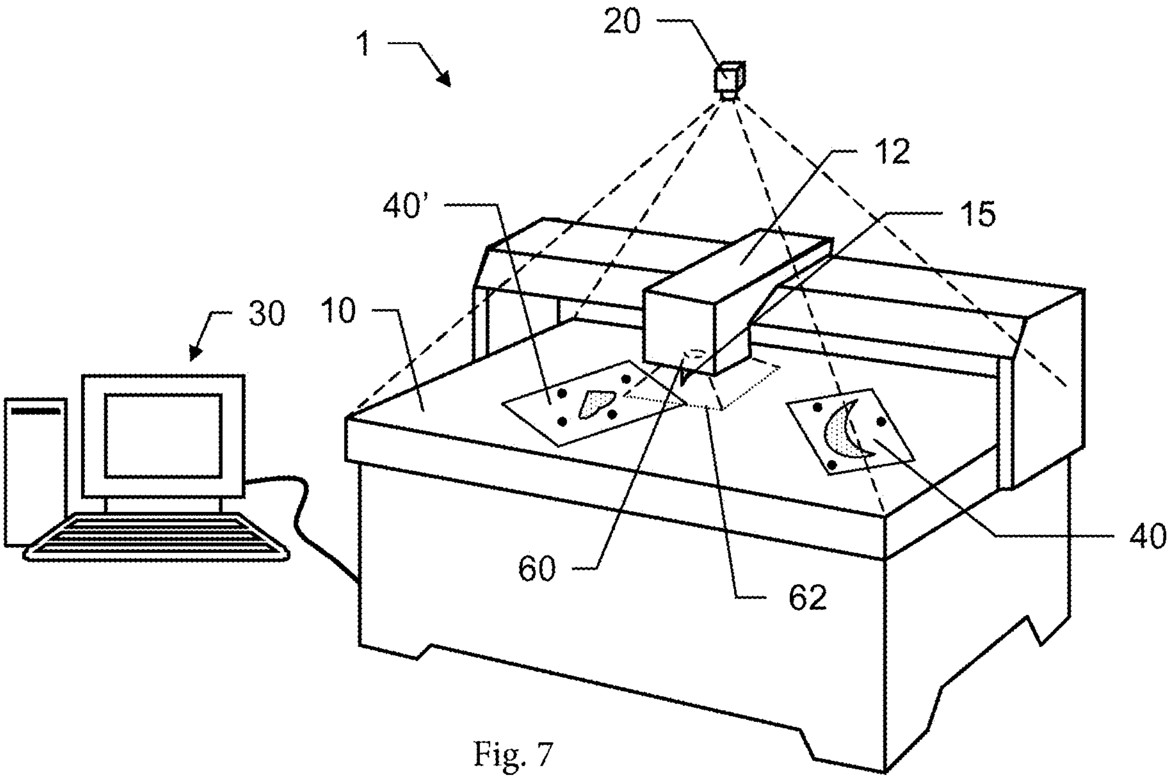
FIG. 7 an exemplary embodiment of the cutting machine according to the fourth aspect of the invention.
Figure 8:
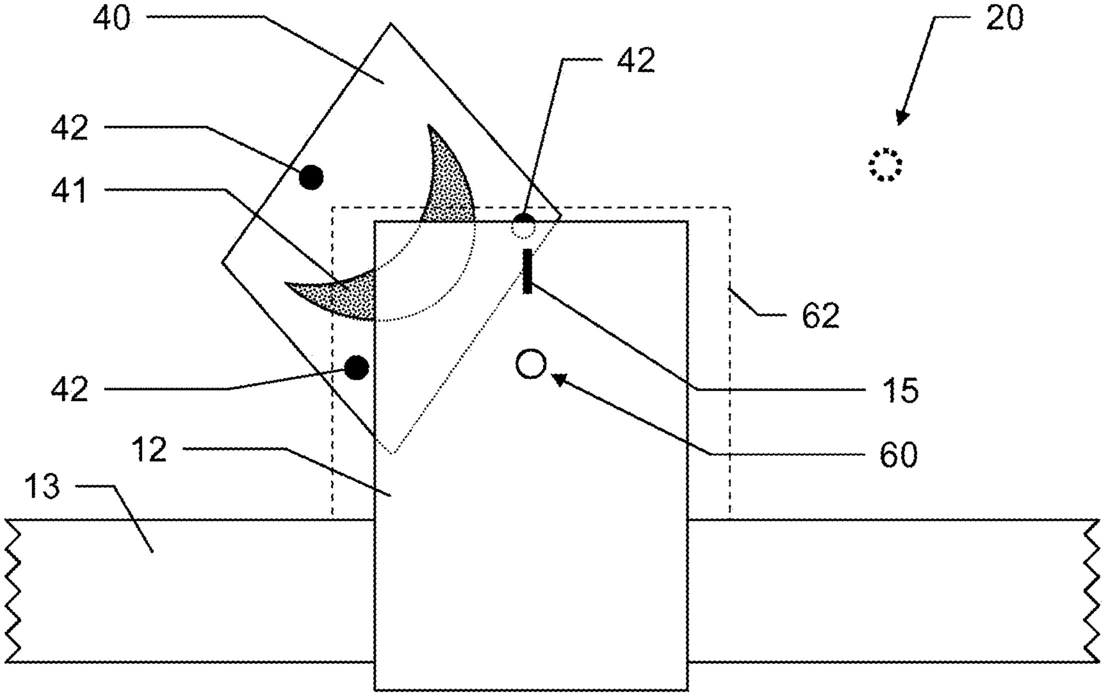
FIG. 8 the working group of the cutting machine from FIG. 7 from above.

In accordance with the fourth aspect of the invention shown in FIGS. 7 and 8, the cutting machine 1 has a further camera 60 in addition to the overview camera 20. This second camera is likewise oriented towards the working surface 10. It has a clearly smaller recording region 62 than the overview camera 20, but is arranged movably relative to the working surface 10, so that preferably images of the entire working surface 10 can be recorded. The second camera 60 is preferably mounted movably as a beam camera on the same beam 13 as the working group 12. In particular, it may be embodied as part of this working group 12. FIGS. 7 and 8 by way of example show a corresponding embodiment of the cutting machine 1.

In FIG. 7 an exemplary embodiment of the cutting machine 1 is shown, wherein a second camera unit 60 is provided in the working group 12 and is designed to record images in the direction of the working surface 10. Here, the image region 62 of said camera in each position comprises only a small part of the working surface 10. The overview camera 20 is also designed in this embodiment to record images of the entire working surface 10.

In FIG. 8 the working group 12 mounted movably on the beam 13 and comprising the blade 15 and beam camera 60 is shown from above. The position of the relatively high overview camera 20 is also shown. The working group 12 is positioned here in such a way that two register marks 42 of an object 40 to be cut are situated in the field of vision 62 of the beam camera 60.

A detailed image recorded by the beam camera 60 may now be compared with the overall image recorded previously by the overview camera 20. The positions of the register marks 42 may thus be verified or determined relative to the working surface 10. An image is firstly recorded by means of the overview camera 20. By means of this image, relative positions of the register marks 42 are firstly determined, that is to say the arrangement of the register marks relative to one another. One or more registered marks 42 is/are then approached by the beam camera 60, and the position of said register mark(s) is determined with high accuracy.

In order to verify the register mark positions, the positions determined with the overview camera 20 are compared with the positions determined with the beam camera 60.

In order to determine the register mark positions on the working surface 10, the positions of all register marks 42 are determined with high accuracy by transformation of the positions determined in the image of the overview camera 20 by the positions determined in the image of the beam camera 60.

Figure 9A:
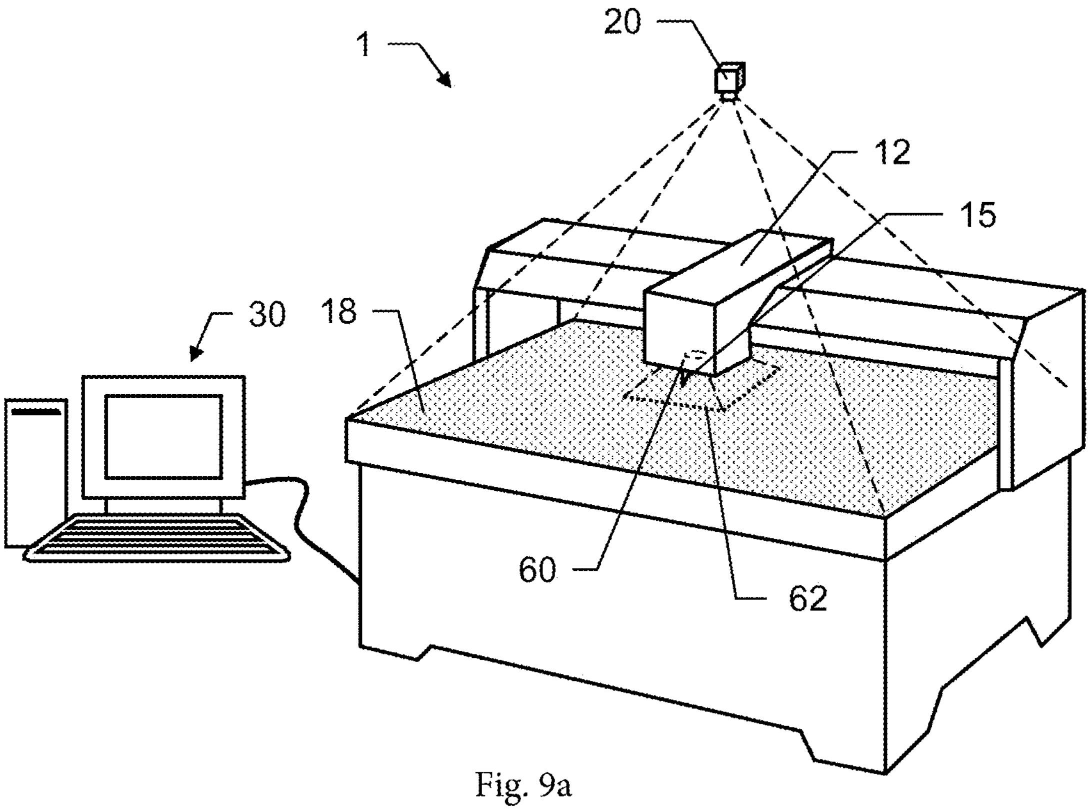
FIGS. 9*a-b* two exemplary embodiments of the cutting machine according to the fifth aspect of the invention.
Figure 9B:
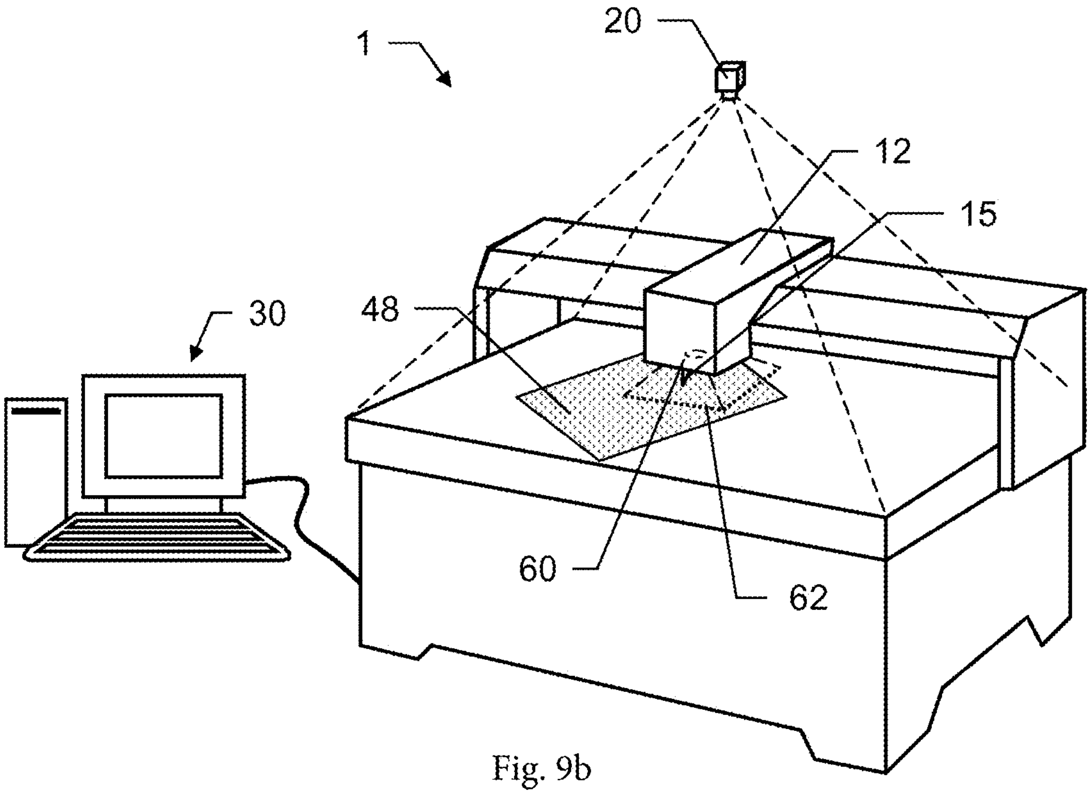

In accordance with the fifth aspect of the invention, such an additional camera 60 may also be used for calibration of the overview camera 20. This is shown in FIGS. 9*a* and 9*b*. The cutting machine 1 in this case has a calibration function controlled by the computing unit 30. Within the scope of this function, once started, positions of a plurality of grid points on the entire working surface 10 may be determined fully automatically with high accuracy with the aid of the beam camera 60. To this end, as shown in FIG. 9*a*, the working surface itself may be embodied as a calibration working surface 18, i.e. may itself comprise the corresponding grid points, or alternatively, as shown in FIG. 9*b*, a calibration sheet 48 is placed on the working surface 10 for calibration and comprises the grid points.

The positions of the grid points determined by the beam camera 60 are stored as target positions. The same grid points are then recorded by the overview camera 20. With the aid of the target positions and the comparison with the positions of the grid points in the image of the overview camera 20, the overview camera 20 and the beam camera 60 may be calibrated relative to one another. If the beam camera 60 is housed in the same working group 12 as the cutting tool 15, errors in the drive system of the working group 12 may thus also be compensated for, advantageously.

In accordance with the sixth aspect of the invention, an ROI (=region of interest) area may be selected already before the image of the overview camera is recorded and is the only area of interest for the determination of the position of the register features. This is illustrated in FIGS. 10*a* and 10*b*.

To this end, cutting instructions are provided, in which specific additional information is stored, which information allows the working surface 10 to be limited to the ROI area. It includes, in particular, anticipated positions of the objects 40, 40' to be cut and their dimensions. Either just one image of the selected areas is then recorded, or just the corresponding areas of the overall image are analysed. This advantageously saves computing and memory capacity and accelerates the process. In addition, printed images are prevented from being incorrectly misinterpreted as register marks. If just one image of the ROI is recorded by the overview camera, the overview camera may additionally be designed to zoom in on the corresponding area, whereby a higher resolution is achievable.

Figure 10A:
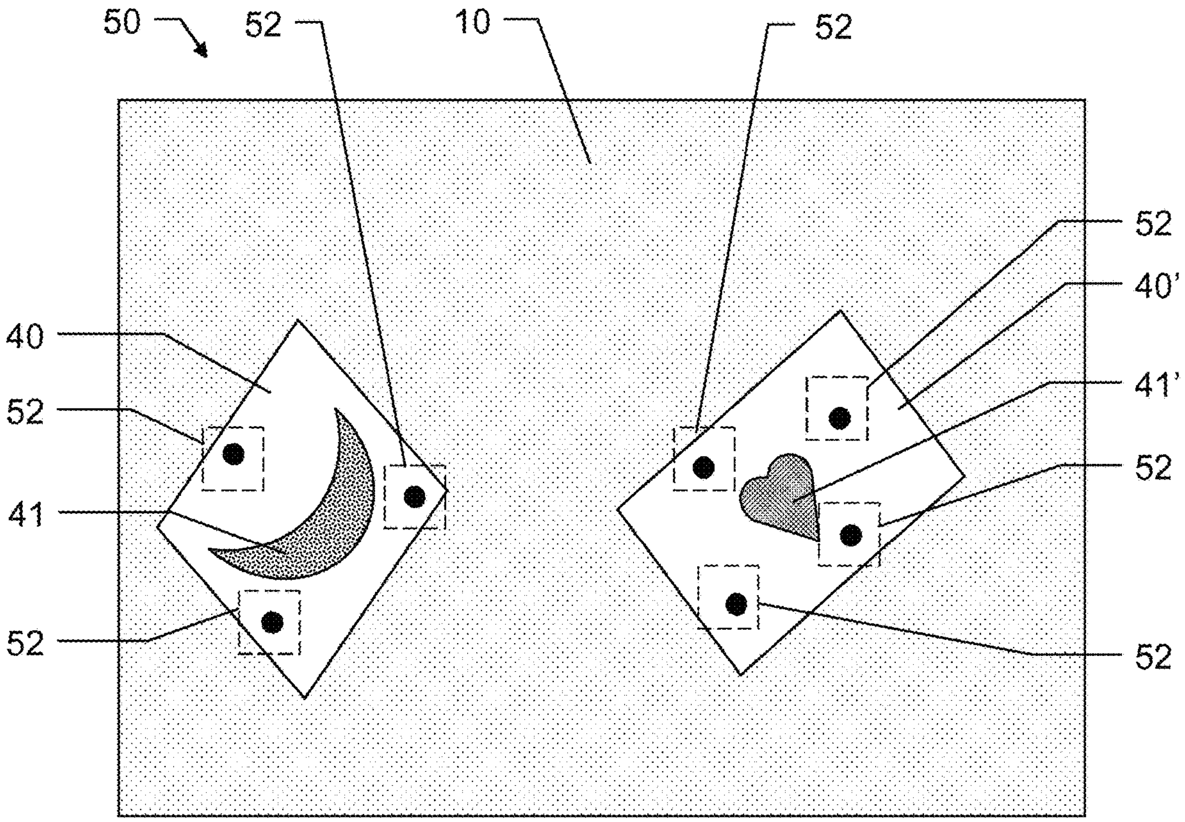
FIG. 10*a-b* areas defined as region of interest in accordance with the sixth aspect of the invention.

In FIG. 10*a* in image 50 of the entire working surface 10 is shown, as has been recorded by the overview camera (see FIG. 2*a*). On the basis of information regarding the likely position of the objects 40, 40' on the working surface 10, areas 52 which each comprise an anticipated position of the relevant registered marks 42 are defined by the computing unit. Only in these areas 52 are register marks 42 searched for, and therefore only positions of register marks 42 which also lie in these areas 52 are determined. This advantageously not only spares computing capacity in time, but also prevents misinterpretations of features of the graphical design 41, 41' as register features.

Figure 10B:
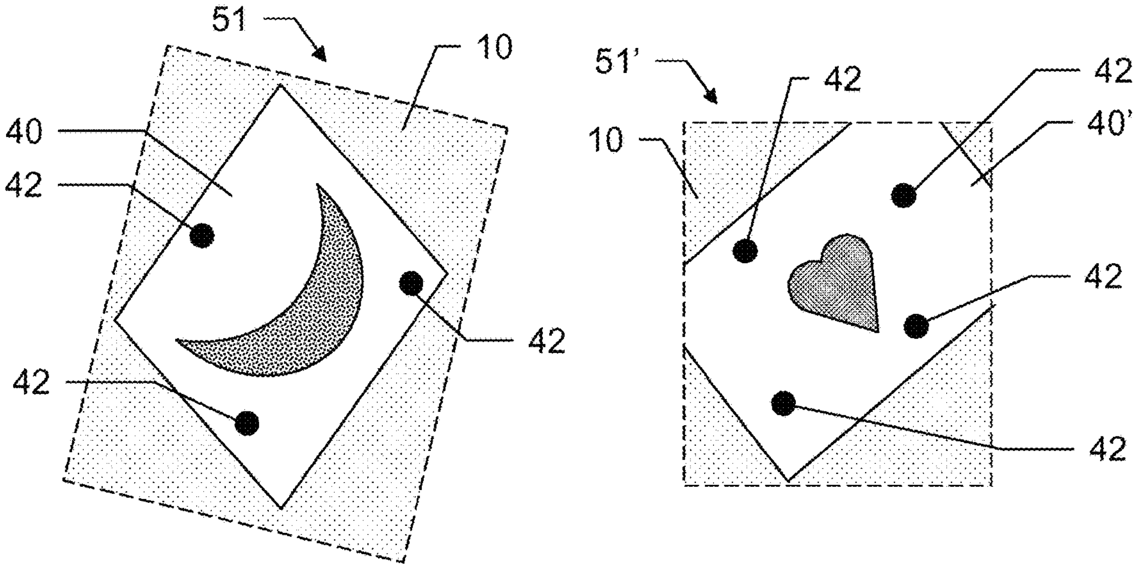

In FIG. 10*b* the image 50 of the overview camera from FIG. 10*a* has been limited to two ROI areas and therefore comprises only the area images 51 and 51'. An object 40, 40' to be cut is shown at least in part in each area image 51, 51', and therefore the register marks 42 are visible, so that a cutting path can be generated in each case. Due to the smaller image area which has to be analysed, the relative positions of the register marks 42 may be detected more quickly, thus accelerating the process.

It goes without saying that these described figures schematically show only possible exemplary embodiments. The various approaches may also be combined with one another and with devices or methods from the prior art.

What is claimed is:

1. A cutting machine configured to cut objects which have a flat surface, the flat surface having a graphical design with optical register features, the cutting machine comprising:

- a working surface configured to receive at least one object;

a first camera unit, which is arranged above the working surface and relative to the working surface in such a way that a field of vision of the first camera unit extends over the entire working surface;

a working group, which is arranged movably above the working surface and has at least one cutting device as a tool of the cutting machine, the at least one cutting device configured to cut the at least one object;

an optical sensor unit, which is oriented in a direction of the working surface and is arranged displaceable relative to the working surface in such a way that a plurality of positions in a detection region of the optical sensor unit is captured by the optical sensor unit, the detection region comprising a part of the working surface; and a computing unit with a circuit and program code for controlling the cutting machine, the computing unit comprising a memory unit for storing instructions for the cutting of certain objects, wherein the computing unit:

has the circuit and program code analyse images of the first camera unit and is configured to recognize the register features of the at least one object in an image of the first camera unit, has the circuit and program code analyse data of the optical sensor unit, and is configured to define a cutting path for the cutting device in accordance with at least one stored instruction and based on positions of the register features in the image, wherein the computing unit is configured to detect positions of at least a first plurality of the register features relative to one another via the image of the first camera unit as relative positions, wherein the computing unit is configured to determine positions of a first subset of the first plurality of the register features relative to the working surface via data from the optical sensor unit as absolute positions, and wherein the computing unit is configured to determine positions of a second subset of the first plurality of the register features relative to the working surface based on the detected relative positions and the determined absolute positions.

2. The cutting machine according to claim 1, wherein the optical sensor unit is a second camera unit.

3. The cutting machine according to claim 1, wherein the optical sensor unit is configured as a part of the working group.

4. The cutting machine according to claim 1, wherein detection regions of the optical sensor unit comprise the entire working surface.

5. The cutting machine according to claim 1, wherein the first camera unit is a line scan camera, wherein the field of vision extends over the width of the working surface.

6. The cutting machine according to claim 1, wherein the computing unit is configured to determine a position of the at least one object on the working surface and/or to define a cutting path based on the positions of register features relative to the working surface.

7. The cutting machine according to claim 1, wherein the register features are register marks which are configured to make a position and orientation of the object detectable relative to the working surface, wherein the computing unit is configured to recognize the register marks on the flat surface of the at least one object in the image of the first camera unit, and to define the cutting path based on positions of the register marks.

8. The cutting machine according to claim 7, wherein the register marks comprise edges of the object.

9. The cutting machine according to claim 1, wherein the computing unit is configured to select an instruction based on recognized register features.

10. A computer program product with program code, which is stored on a machine-readable carrier, for controlling the cutting machine according to claim 1, wherein the program is executable on the computing unit of the cutting machine and, upon execution, performs the following:

recording the image of the working surface via the first camera unit;

recognizing register features of at least one object in the image and detecting positions of at least a plurality of the register features relative to one another as relative positions;

determining positions of a first subset of the plurality of the register features relative to the working surface via data from the optical sensor unit as absolute positions;

determining positions of a second subset of the plurality of the register features relative to the working surface based on the detected relative positions and the determined absolute positions;

associating the at least one object with at least one stored instruction;

defining at least one cutting path based on the at least one stored instruction and the determined positions of the first subset and/or the second subset of the plurality of the register features; and controlling a cutting device of the cutting machine for cutting the at least one object along the at least one cutting path.

11. The cutting machine according to claim 1, wherein the detection region of the first sensor unit comprises the field of vision of the first camera unit.

* * * * *